United States Patent
Delagarrigue

(10) Patent No.: US 9,967,913 B2
(45) Date of Patent: *May 8, 2018

(54) MODULAR WIRELESS NETWORK ACCESS DEVICE

(71) Applicant: XIRRUS INC., Thousand Oaks, CA (US)

(72) Inventor: Michael J. Delagarrigue, Agoura Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/006,936

(22) Filed: Jan. 26, 2016

(65) Prior Publication Data

US 2016/0219642 A1 Jul. 28, 2016

Related U.S. Application Data

(63) Continuation of application No. 13/566,711, filed on Aug. 3, 2012, now Pat. No. 9,247,573.

(60) Provisional application No. 61/521,218, filed on Aug. 8, 2011.

(51) Int. Cl.
*H04W 76/02* (2009.01)
*H04B 7/0413* (2017.01)
*H04W 4/00* (2018.01)
*H04W 88/10* (2009.01)
*H04W 84/12* (2009.01)

(52) U.S. Cl.
CPC ........ *H04W 76/025* (2013.01); *H04B 7/0413* (2013.01); *H04W 4/008* (2013.01); *H04W 84/12* (2013.01); *H04W 88/10* (2013.01)

(58) Field of Classification Search
CPC ...... H04W 80/04; H04W 84/12; H04W 88/06
See application file for complete search history.

(56) References Cited

U.S. PATENT DOCUMENTS

| | | | | |
|---|---|---|---|---|
| 5,926,378 A | * | 7/1999 | DeWitt | G06F 13/409 361/788 |
| 8,503,341 B2 | * | 8/2013 | Yang | H04W 4/18 370/310 |
| 2005/0008068 A1 | * | 1/2005 | Stegherr | H04L 1/243 375/222 |
| 2009/0022114 A1 | * | 1/2009 | Smith | H01Q 1/007 370/338 |

(Continued)

*Primary Examiner* — Zhiren Qin
(74) *Attorney, Agent, or Firm* — SoCal IP Law Group LLP; John E. Gunther; Steven C. Sereboff

(57) ABSTRACT

In view of the above, a wireless network access device is provided. In an example implementation, the wireless network access device includes a radio interface having a plurality of individually addressable radio paths for providing a connection to corresponding radio modules. Each radio module includes a radio configured to communicate with client devices in a corresponding coverage area. Each radio module is configured to operate independently of the other radio modules. A network interface is included to provide data network access. The wireless network access device includes a processor to manage communication between the client devices that communicate with the radio modules and a data network via the radio interface and the network interface when the wireless local area network device includes at least one connected radio module.

27 Claims, 7 Drawing Sheets

(56) References Cited

U.S. PATENT DOCUMENTS

| | | | |
|---|---|---|---|
| 2009/0271556 A1* | 10/2009 | Rutherford, III ... | G06F 13/4022 710/313 |
| 2010/0197281 A1* | 8/2010 | Bennett ................... | H04L 12/14 455/414.1 |
| 2011/0040916 A1* | 2/2011 | Atherton ............. | G06F 13/4295 710/300 |

* cited by examiner

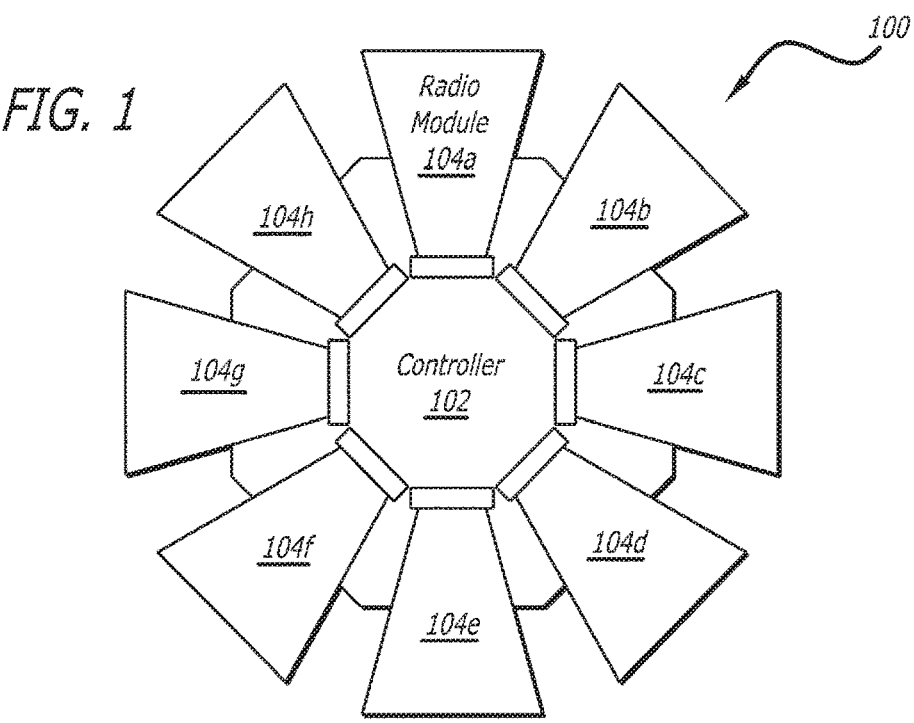
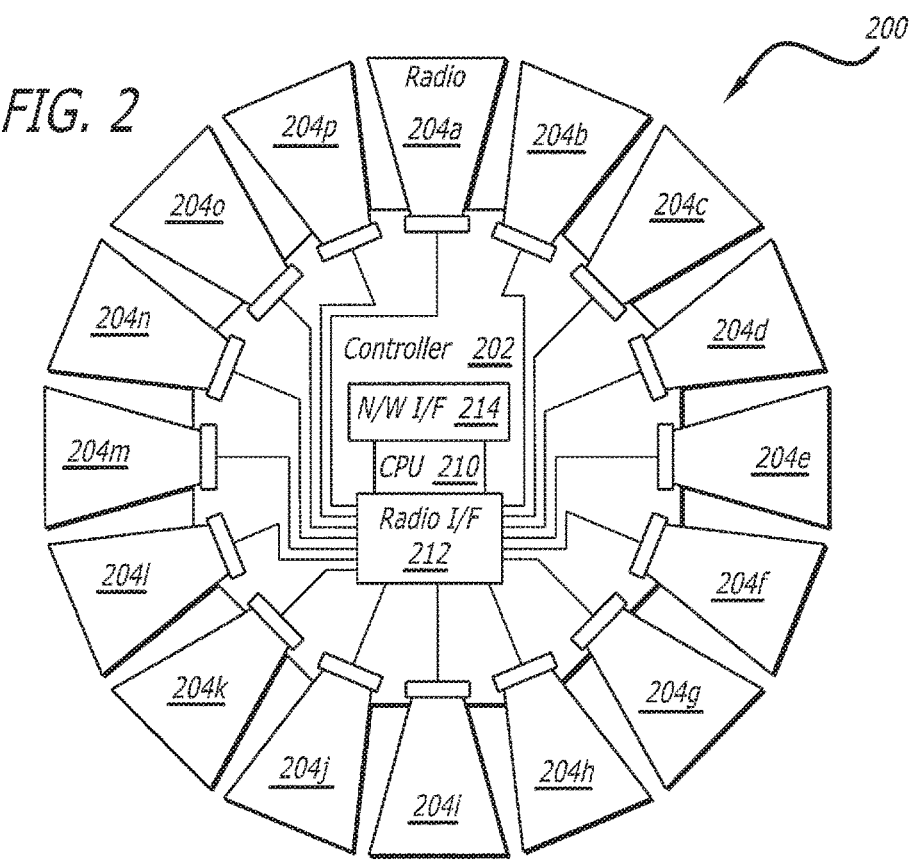

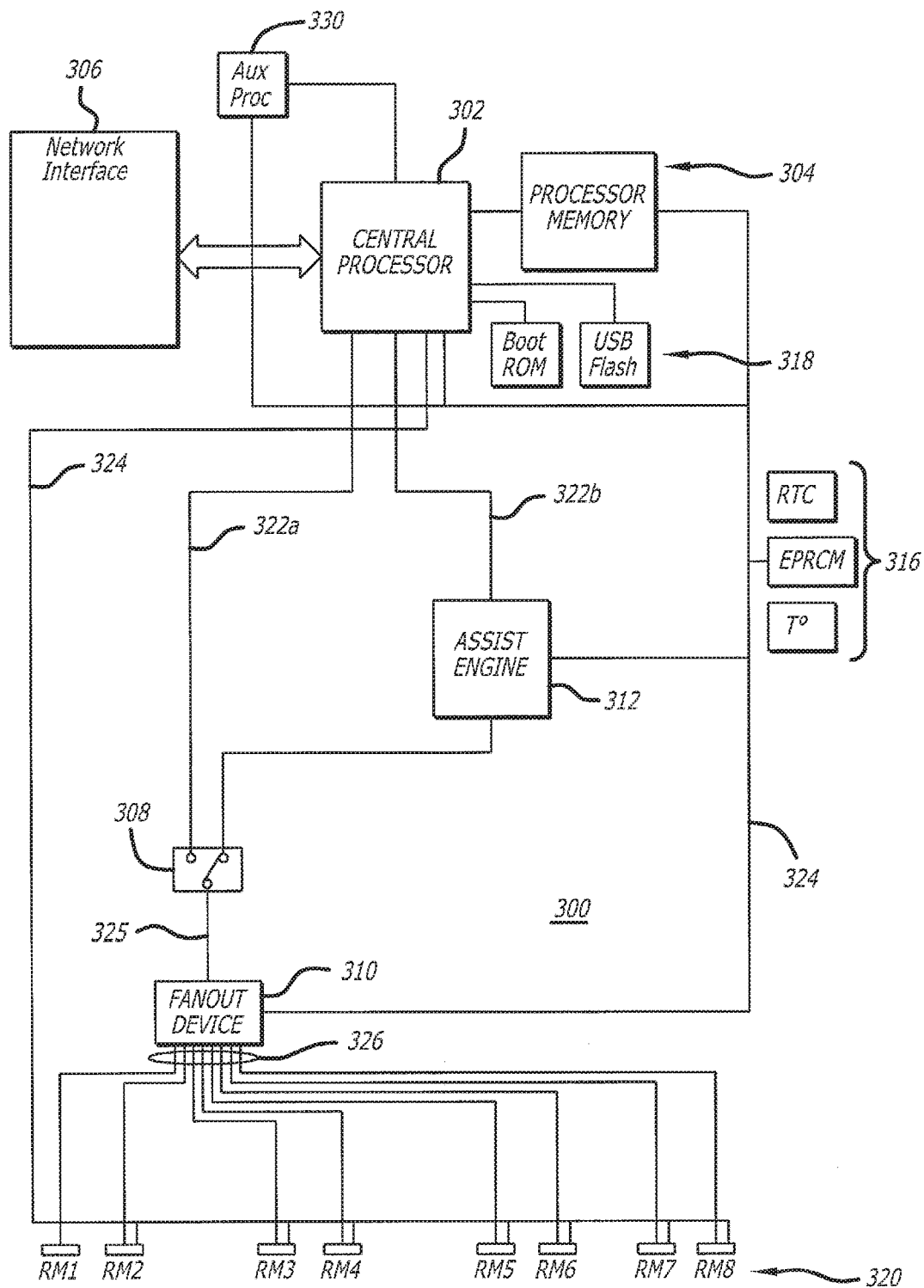

MODULAR WIRELESS NETWORK ACCESS DEVICE

CROSS-REFERENCE To RELATED APPLICATION

This application is a continuation of U.S. Non-Provisional patent application Ser. No. 13/566,711, entitled "Modular Wireless Network Access Device," filed on Aug. 3, 2012, to inventor Michael J. de la Garrigue, which application issued as U.S. Pat. No. 9,247,753, on Jan. 26, 2016, and which application claims priority of U.S. Provisional Patent Application Ser. No. 61/521,218, entitled "Modular Wireless Network Array," filed on Aug. 8, 2011, to inventor Michael J. de la Garrigue, the disclosures of which are both incorporated by reference herein in their entireties.

BACKGROUND OF THE INVENTION

1. Field of the Invention

This invention relates generally to systems and methods for providing wireless networking resources, and more particularly to modular wireless networking resources for communication using a multiple, independent, interchangeable, and distinct wireless communications devices.

2. Related Art

The use of wireless communication devices for data networking is growing at a rapid pace. Data networks that use "Wi-Fi" ("Wireless Fidelity") are relatively easy to install, convenient to use, and supported by the IEEE 802.11 standard. Wi-Fi data networks also provide performance that makes Wi-Fi a suitable alternative to a wired data network for many business and home users. Wireless communications for data networks also include using the cellular telephone and mobile communications infrastructure. The use of Bluetooth® and other standards implementing a wide variety of wireless technologies is also growing.

In WiFi networks, wireless access points provide users having wireless (or "client") devices in proximity to the access point with access to data networks. The wireless access points include a radio that operates according to different aspects of the IEEE 802.11 specification. Generally, radios in the access points communicate with client devices by utilizing omnidirectional antennas that allow the radios to communicate with client devices in any direction. The access points are then connected (by hardwired connections) to a data network system, which completes the access of the client device to the data network.

WiFi access points typically include a single omnidirectional radio that communicates with the clients in proximity to the access point. Recently, WiFi systems have incorporated multiple radios with an integrated controller connected to a LAN, or other data network infrastructure. Examples of such multiple radio WiFi systems are disclosed in:

U.S. patent application Ser. No. 11/816,003, filed on Aug. 10, 2007, titled "Wireless LAN Array," and incorporated herein by reference in its entirety;

U.S. patent application Ser. No. 11/816,060, filed on Aug. 10, 2007, titled "Assembly and Mounting for Multi-Sector Access Point Array," and incorporated herein by reference in its entirety;

U.S. patent application Ser. No. 11/816,061, filed on Aug. 10, 2007, titled "Media Access Controller for Use in a Multi-Sector Access Point Array," and incorporated herein by reference in its entirety;

U.S. patent application Ser. No. 11/816,064, filed on Apr. 3, 2008, titled "Antenna Architecture of a Wireless LAN Array," and incorporated herein by reference in its entirety; and U.S. patent application Ser. No. 11/816,065, filed on Aug. 10, 2007, titled "System for Allocating Channels in a Multi-Radio Wireless LAN Array," and incorporated herein by reference in its entirety.

WiFi access points that employ multiple radios use radios specifically configured for operation in the specific WiFi access point implementation. The multiple radios are also provided as multiple radio chains in a single structure, or in multiple modules in which single radios do not operate or may not be removed or added independently of each other. As such, the access points lack the flexibility to use independently configured radios, or technologies.

There is a need for wireless networking solutions that allow control over radios that operate independently without any functional or physical dependency on other radios, interchangeably to allow radios to be replaced with other radios in an implementation, and differently using different standards or variations of standards or technologies.

SUMMARY

In view of the above, a wireless network access device is provided. In an example implementation, the wireless network access device includes a radio interface having a plurality of individually addressable radio paths for providing a connection to corresponding radio modules. Each radio module includes a radio configured to communicate with client devices in a corresponding coverage area. Each radio module is configured to operate independently of the other radio modules. A network interface is included to provide data network access. The wireless network access device includes a processor to manage communication between the client devices that communicate with the radio modules and a data network via the radio interface and the network interface when the wireless local area network device includes at least one connected radio module.

In example implementations, a method is provided for configuring a wireless network access device having a wireless network access device controller, a network interface, and a radio interface having a plurality of individually addressable radio paths for providing a connection to corresponding radio modules. In an example of the method, at least one radio module is selected from among a group of different types of radio modules. The selected radio modules are inserted into selected connectors corresponding to the individually addressable radio paths. The access device operates to provide communications between client devices having wireless connections with the selected radio modules and a data network via the network interface.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

FIG. 1 is an overhead schematic view of an example of a wireless network access device.

FIG. 2 is an overhead schematic view of another example of a wireless network access device.

FIG. 3 is a schematic diagram of an example controller that may be used in the example wireless network access device shown in FIG. 1.

DETAILED DESCRIPTION

Figure 4:
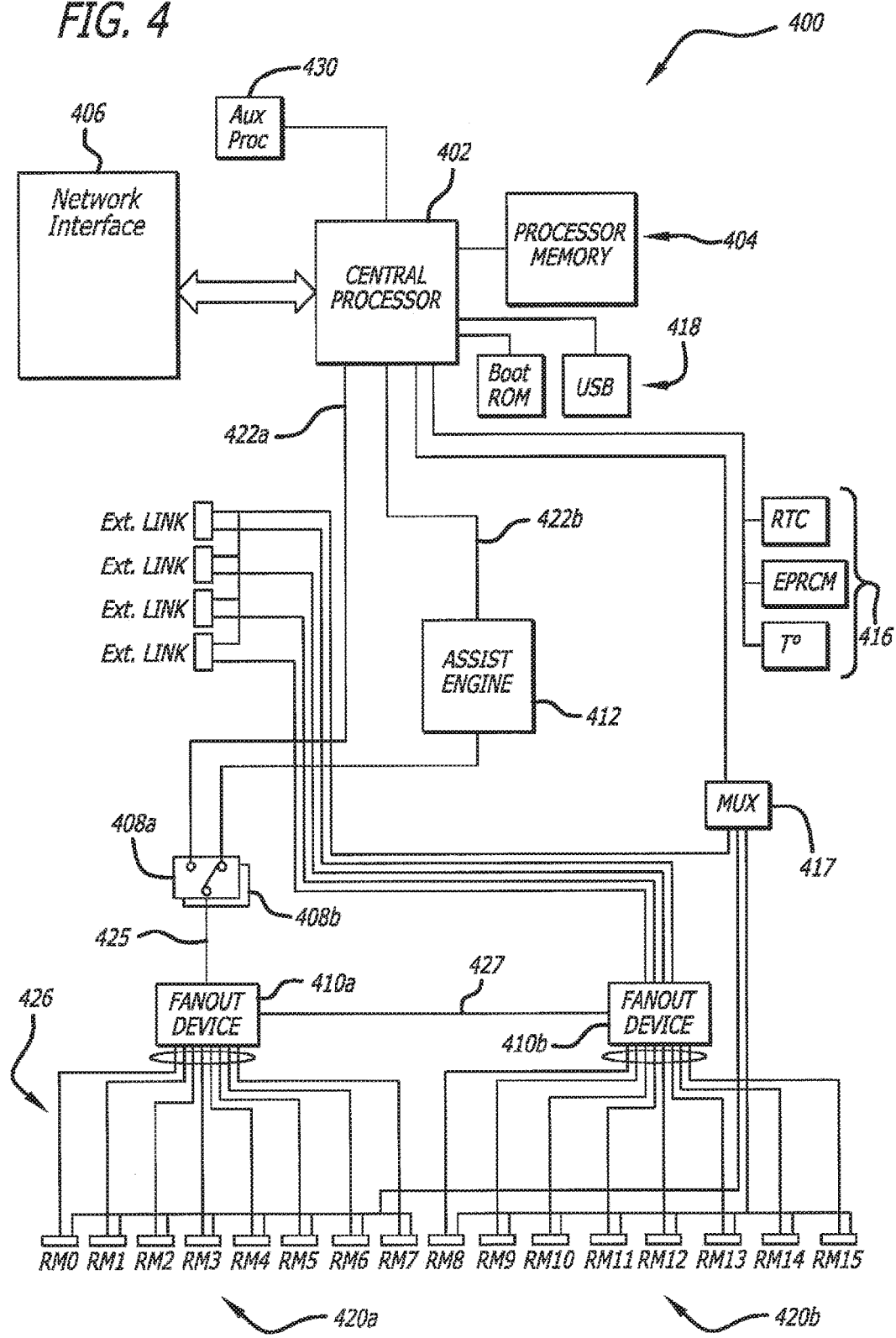
FIG. 4 is a schematic diagram of an example controller that may be used in the example wireless network access device shown in FIG. 2.

In the following description of example embodiments, reference is made to the accompanying drawings that form a part of the description, and which show, by way of illustration, specific example embodiments in which the invention may be practiced. Other embodiments may be utilized and structural changes may be made without departing from the scope of the invention.

I. Overview

Examples of modular wireless network platforms are described below as wireless network access devices that may be implemented in a housing having a plurality of radial sectors and a plurality of antennas arranged to provide coverage from the radial sectors. One or more of the plurality of antennas may be arranged within individual radial sectors of the plurality of radial sectors.

The radial sectors may be configured to define radiation patterns, or coverage patterns, that cover airspace in targeted sections, or sectors. The coverage patterns may be configured in a manner that, when combined, a continuous coverage is provided for a client device that is in communication with the wireless network access device. It is noted that the term "client device" is used in this specification to refer to any device with which a wireless communications connection may be made with a radio.

The radiation patterns may overlap to ease management of a plurality of client devices by allowing adjacent sectors to assist each other. For example, adjacent sectors may assist each other in managing the number of client devices served with the highest throughput as controlled by a controller. The arrangement of antennas in radial sectors provides increased directional transmission and reception gain that allow the wireless network access device and its respective client devices to communicate at greater distances than standard omnidirectional antenna systems, thus producing an extended coverage area when compared to an omnidirectional antenna system.

The antennas used in the radial sectors may include any suitable number and type of antenna in each sector. Examples of antenna arrays that may be used are described in:

PCT Patent Application No. PCT/US2006/008747, filed on Jun. 9, 2006, titled "WIRELESS LAN ANTENNA ARRAY," and incorporated herein by reference in its entirety, U.S. patent application Ser. No. 12/269,567 filed on Nov. 12, 2008, titled "MIMO Antenna System," and incorporated herein by reference in its entirety, U.S. patent application Ser. No. 12/987,040 ("'040") filed on Dec. 31, 2010, titled "MIMO Antenna System," and incorporated herein by reference in its entirety, and U.S. patent application Ser. No. 13/115,091 ("'091") filed on May 24, 2011, titled "MIMO Antenna System having Beamforming Networks," and incorporated herein by reference in its entirety.

For purposes of maintaining clarity in the description of the example wireless network access devices below, the antennas in the examples are described as employing multiple input, multiple output ("MIMO") schemes. It is to be understood by those of ordinary skill in the art that example implementations are not limited to the type of antennas described.

The examples of wireless network access devices described below include independently operating radio modules in each radial sector. The radio modules may provide a coverage pattern as described above, or each radio module may be configured to generate independent coverage patterns, which may include directional or omni-directional radiation patterns. The number of radio modules used in the wireless network access device may also be varied and various different radio module types may be combined to provide scalability of performance, cost, and diversity of functionality in any given implementation.

II. Modular Wireless Network Access Device

FIG. 1 is an overhead schematic view of an example of a wireless network access device 100 having a controller 102 and a plurality of radio modules 104a-104h. The example wireless network access device 100 in FIG. 1 includes eight radio modules 104a-104h. The controller 102 may be configured to operate with an optional number of radio modules 104 up to a maximum of 8 in FIG. 1. The controller 100 may be configured to operate in different modes involving a certain number of radio modules 104. For example, the controller 102 may be configured to operate in a 4-port, or an 8-port wireless network access device. The controller 102 may also simply adapt to the number of radio modules 104 connected to it. The controller 102 may be configured to ensure a 360° coverage pattern regardless of the number of radio modules 104, or to cover an area having a shape customized for a specific installation.

FIG. 2 is an overhead schematic view of an example of a wireless network access device 200 having a controller 202 and a plurality of radio modules 204a-204p. The wireless network access device 200 in FIG. 2 is similar to the wireless network access device 100 in FIG. 1 except that up to 16 radio modules 204a-204p may be connected to the controller 202 instead of the 8 in FIG. 1. The wireless network access device 200 in FIG. 2 also shows a block diagram of the controller 202 including a central processor 210, a radio interface 212, and a network interface 214. The central processor 210 provides the processing resources for the controller 202. The central processor 210 operates with the radio interface 212 to communicate with the radio modules 204a-p, and the network interface 214 to connect the wireless network access device 200 to wider data network resources.

The radio interface 212 is configured to connect the radio modules 204a-204p to data network resources as individual, independently operating radios configured to communicate with client devices in the radial sector in which the radios operate. Each radio module 204a-204p includes a single radio operating independently of the other radio modules 204a-204p. For example, one or more radio modules 204a-204p may be configured to operate as 3×3 802.11n radios, others may be configured to operate as 2×2 802.11n radios, others may have a single antenna chain, and others may be configured to communicate with cellular devices. One or more of the radio modules 204a-204p may also be configured to operate with an omnidirectional coverage pattern while one or more of the remaining radio modules 204a-204p may operate with a directional coverage pattern in the same installation. Each radio module 204a-204p includes an interface configured to operate with the radio interface 212 on the controller 202.

In one example implementation, the radio interface 212 operates using the standard PCI Express® ("PCIe®") peripheral interface. The radio interface 212 on the controller 202 communicates with each radio module 204a-204p connected to the controller 202 in accordance with the PCIe® standard. The radio interface 212 manages serial links to each radio module in accordance with the PCIe® standard. The PCIe® standard is not intended to be limiting. It is to be understood by those of ordinary skill in the art that any interface, whether standard or proprietary, may be used for communication to the radio modules 204a-204p.

The network interface 214 provides the radio modules 204a-204p with access to the data network resources allowing client devices in communication with the radio modules 204a-204p to communicate over data networks such as the Internet. Any suitable scheme may be used for the network interface 214, which may include hardware and software components that allow connectivity for a variety of radio types, including WiFi radios, cellular radios, and any other radio configured for operation in the wireless network access device 200 in FIG. 2.

The wireless network access devices 100, 200 shown in FIGS. 1 and 2 provide a modular and flexible platform for implementing wireless access. The wireless network access devices 100, 200 operate using controllers 102, 202 having a generalized interface to the radio modules 104 et seq., 204 et seq. The radio modules 104 et seq., 204 et seq. implement the generalized interface regardless of the type of radio, or configuration or standard used for the radio. In addition, each radio module 104 et seq., 204 et seq. conforms to the same size and shape. In an example implementation, radio modules 104 et seq., 204 et seq. may be configured for operation on either the first wireless network access device 100 in FIG. 1, or in the second wireless array 200 in FIG. 2, where both wireless network access devices 100, 200 are made available. It is to be understood that the two wireless network access devices 100, 200 are described here as examples of configurations that may be used in terms of number of the radio modules as well as the shape selected to allow for modularity. Other examples may have more or fewer radio modules having a different shape.

III. Modular Wireless Network Access Device

FIG. 3 is a schematic diagram of an example controller 300 that may be used in the example wireless network access device 100 described above with reference to FIG. 1. The controller 300 in FIG. 3 includes a central processor 302, a processor memory 304, a network interface 306, a signal switch 308, a radio path fanout device 310, and an assist engine 312 for communication with up to eight radio modules 320. The controller 300 may be configured to provide a radio interface that includes a plurality of individually addressable point-to-point connections between the central processor 302 and each radio module. The point-to-point connections may be implemented as high-speed, serial connections at one, or a selectable one of several ports, on the central processor 302 over a first radio interface path from the port on the central processor 302 to the fanout device 310. The fanout device 310 may be controlled to select one of a plurality of radio paths connected from the fanout device 310 to a corresponding radio module 320 to complete the point-to-point connection between the central processor 302 and the corresponding radio module 320.

In an example implementation, the central processor 302 may include built-in interfaces and connections for any of the network interface 306 and the radio interface in accordance with selected standards. For example, the central processor 302 in the controller 300 in FIG. 3 may be an off-the-shelf processor having a standard Ethernet interface and a standard peripheral interface, such as for example a PCIe® interface. One example processor that may be used, without limitation, is a Cavium® Octeon® CN52xxx processor. In other example implementations, a more general purpose processor may be used, which may require adding components for implementing specific network and peripheral interface standards that may be desired. In the example shown in FIG. 3, the central processor 302 includes an Ethernet interface and a PCIe® interface accessible via connections directly on the processor device, or chip. Any suitable processor may be configured to operate as the central processor 302 in FIG. 3, and the radio interface may be implemented using a standard interface such as the PCIe® standard, or using a proprietary bus interface configured to operate as described herein.

The controller 300 includes other processor support components, such as for example, a non-volatile memory 318, including for example, a boot ROM and a USB FLASH drive interface. The controller 300 may include other support components 316, such as for example, a clock, EPROM, and a temperature sensor. An auxiliary processor 330 may also be included to offload housekeeping or administrative functions (such as watchdog) from the central processor 302. An integrated interface control bus 324 may also be included to allow the central processor 302 to address processing peripherals, such as the supporting processing components including the EPROM at 316, the auxiliary processor 330, and the assist engine 312 by software functions programmed to access the components. These support components, the integrated interface control bus and auxiliary processors are optional or basic computing equipment components that require no further discussion.

The central processor 302 in FIG. 3 includes two input/output (I/O) ports, or pins on the chip, for communicating over corresponding integrated and independent radio interface paths 322a, 322b to which the I/O ports connect. The control software operating under control of the central processor 302 may select one of the two radio interface paths 322a, 322b for communication with a selected one of up to eight radios 320. The control software may also control the signal switch 308 to enable the connection to the radio path fanout device 310. The fanout device 310 further controls the connection to the selected radio. Each of the radio interface paths 322a, 322b includes multiple lanes configured to perform full duplex transmit and receive functions. The multiple lanes provide increased bandwidth to each radio interface path 322a, 322b. In an example implementation in accordance with FIG. 3, each lane may have a bandwidth of up to 2 Gbps providing up to 4 Gbps for each radio interface path 322a, 322b. Each radio interface path 322a, 322b may be connected to one of the radios 320 to form a single link supported by the multiple lanes.

One of the two radio interface paths 322a, 322b may connect directly to the signal switch 308. The other radio interface path 322a, 322b may include an assist engine 312 operating in-line, or as a "look-aside" component for performing functions that assist the operation of the controller 300. These operations may provide boosts in performance, the ability to test performance, or other operation assisting functions. The signal switch 308 couples the selected radio interface path 322a, 322b to a single interface link 325 connected to the fanout device 310.

The radio path fanout device 310 connects the single two-lane interface link 325 to one of up to 8 single lane radio paths 326. The 8 single lane radio paths 326 extend to corresponding connectors on the controller 300 as illustrated in the controller 102 in FIG. 1. In an example implementation, each single lane radio path 326 may have a bandwidth of up to 2.0 Gbps if encoded (2.5 Gbps if un-encoded). The radio path fanout device 310 may be programmed and controlled, using for example, the integrated interface control bus 324, to tune the electrical qualities of each link for optimal performance. The selected single lane radio path 326 may then connect to the selected radio interface path 322a, 322b at the signal switch 308. The fanout device 310 controls the conversion from a single lane radio path 326 to a two-lane (transmit and receive) radio interface path 322a, 322b.

FIG. 4 is a schematic diagram of an example controller 400 that may be used in the example wireless network access device 200 described above with reference to FIG. 2. The controller 400 in FIG. 4 includes a central processor 402, a processor memory 404, a network interface 406, a pair of signal switches 408a and 408b, a pair of radio path fanout devices 410a and 410b, and an assist engine 412 for communication with up to sixteen radio modules 420a,b. The controller 400 in FIG. 4 may include a radio interface configured similar to the radio interface described above with reference to FIG. 3. For example, the radio interface in the controller 400 may include multiple point-to-point serial connections between the central processor 402 and each radio module 420a and 420b. The central processor 402 may connect to the fanout device 410a, which connects to the radio modules 420a over individual radio paths.

In an example implementation, the central processor 402 may include built-in interfaces and connections for any of the network interface 406 and the radio interface in accordance with selected standards. For example, the central processor 402 in the controller 400 in FIG. 4 may be an off-the-shelf processor having a standard Ethernet interface and a standard peripheral interface, such as for example a PCIe® interface. One example processor that may be used, without limitation, is a Cavium® Octeon® CN63xxxx processor. In other example implementations, a more general purpose processor may be used, which may require adding components for implementing specific network and peripheral interface standards that may be desired. In the example shown in FIG. 4, the central processor 402 includes an Ethernet interface and a PCIe® interface accessible via connections directly on the processor device, or chip. Any suitable processor may be configured to operate as the central processor 402 in FIG. 4, and the radio interface may be implemented using a standard interface such as the PCIe® standard, or using a proprietary bus interface configured to operate as described herein.

The controller 400 may include other processor support components similar to the controller 300 in FIG. 3. The corresponding components are numbered, but no additional description is needed.

Similar to the central processor 302 in FIG. 3, the central processor 402 in FIG. 4 includes two input/output (I/O) ports, or pins on the chip, for communicating over corresponding integrated and independent radio interface paths 422a, 422b connected to the I/O ports. The control software operating under control of the central processor 402 may select one of the two radio interface paths 422a, 422b for communication with a selected one of up to sixteen radios 420. The control software may also control the signal switches 408a, 408b to enable the connection to the radio path fanout devices 410a, 410b. The fanout devices 410a, 410b further control the connection to the selected radio. Each of the radio interface paths 422a, 422b includes multiple lanes, each path operating as a full-duplex receive/transmit connection. Each radio interface path 422a, 422b configures the four lanes to provide a single link with a throughput equal to the sum of the four lanes. In an example implementation, each radio interface path 422a, 422b includes four lanes, where each lane may have a bandwidth of up to 2 Gbps (or 2.5 Gbps if unencrypted) providing up to 8 Gbps (or 10 Gbps if unencrypted) for each radio interface path 422a, 422b.

It is noted that the described examples of radio interface paths 322a, 322b (with reference to FIG. 3) and 422a, 422b (with reference to FIG. 4) conform to the PCI express® interface standard. Other configurations according to other standards may be used as well. The radio interface paths may be parallel or serial buses, designed as proprietary interfaces or under another suitable standard.

One of the two radio interface paths 422a, 422b may connect directly to the signal switches 408a, 408b. Each switch 408a, 408b connects corresponding pairs of the multiple lanes that form the radio interface paths 422a, 422b. A single switch block that accommodates the four lanes may also be implemented. The other radio interface path 422a, 422b may include an assist engine 412 operating in-line, or as a "look-aside" component for performing functions that assist the operation of the controller 400. These operations may provide boosts in performance, the ability to test performance, or other operation assisting functions. The signal switches 408a, 408b couple the selected radio interface path 322a, 322b to a single four lane interface link 425 connected to the fanout device 310.

The radio path fanout devices 410a, 410b connects the single four-lane interface link 425 to one of up to 16 single lane radio paths 420a and 420b. Each radio path fanout device 410a, 410b connects to a corresponding group of 8 radio paths 420a, 420b. The 16 single lane radio paths 426 extend to corresponding connectors on the controller 400 as illustrated in the controller 202 in FIG. 2. In an example implementation, each single lane radio path 426 may have a bandwidth of up to 2.0 Gbps if encoded (2.5 Gbps if un-encoded). The radio path fanout devices 410 may be programmed and controlled, using for example, the integrated interface control bus 424 to tune the electrical qualities of each link for optimal performance. When more than eight radios are connected, the two radio path fanout devices 410a, 410b may cooperate via a fanout coupling 427 to select the correct radio. The radio path 426 may then connect to the selected radio interface path 422a, 422b at the signal switches 408a, 408b. The fanout devices 410a, 410b controls the conversion from a single lane radio path 426 to the multiple (4) lane radio interface paths 422a, 422b.

IV. Radio Modules

The wireless network access devices 100, 200 shown in FIGS. 1 and 2, respectively, are configured to operate using radio modules 104a-h and 204a-p in FIGS. 1 and 2 respectively, created from a single radio instance that includes an antenna design and a common physical shape. The shape enhances the operation of the antenna system by incorporating geometry that enhances the design of the antenna systems. The shape also allows the radio module 104 et seq., 204 et seq. to be used in a variety of products providing a platform on which to build various RF solutions. For example, a radio module may operate using a dual chain WiFi MIMO radio. Another radio module in the same implementation and connected to the same controller, may operate using a triple chain WiFi MIMO design; while still another radio module in the same implementation may operate using another dual chain WiFi that may have a different design, which may include a single in, single out design. By using one shape for the radio module, all three designs can be placed into a single system just by updating the system software.

The modularity provided by the radio module platform facilitates a system configuration and provides flexibility using easily interchangeable radio modules. This flexibility in the choice of radio technology may remain throughout the lifetime of the system and may even expand the flexibility available for enhancing system operation via field upgrades. Future radio modules may be designed using increasingly powerful chipsets that may be designed on to the radio module platform and inserted into the system as required.

The size and shape of the radio module also allow for the inclusion of the antennas directly onto the module. While different radio modules would most likely have different antennas (in terms of geometry, layout, and type of channel formed), space on the radio module allows them to be included directly on the module. In other example implementations, antennas could be off-board and adapted to connect using cable assemblies.

The electrical interface to the radio module from the controller (such as 102, 202 in FIGS. 1 and 2, respectively) may be proprietary or standard. An industry-standardized interface such as PCIe® may be selected on the basis of a simple connection already available on a host central processor card. The use of off the shelf chips, connectors, and software drivers may then be included to substantially lower the system cost.

In configuring a modular wireless network access device, radio modules may be adapted to:
1) Operate with an integrated wireless LAN AP/Controller with embedded, directionalized antenna systems that may be used in multiple product platforms.
2) Include multiple antenna systems suited for operation under platform specific requirements.
3) Mate electrically to the central processing unit through a PCI Express or other standardized interface protocols.
4) Mate mechanically to the central processing unit with a combination of a standardized connector and custom latching system.

Figure 5:
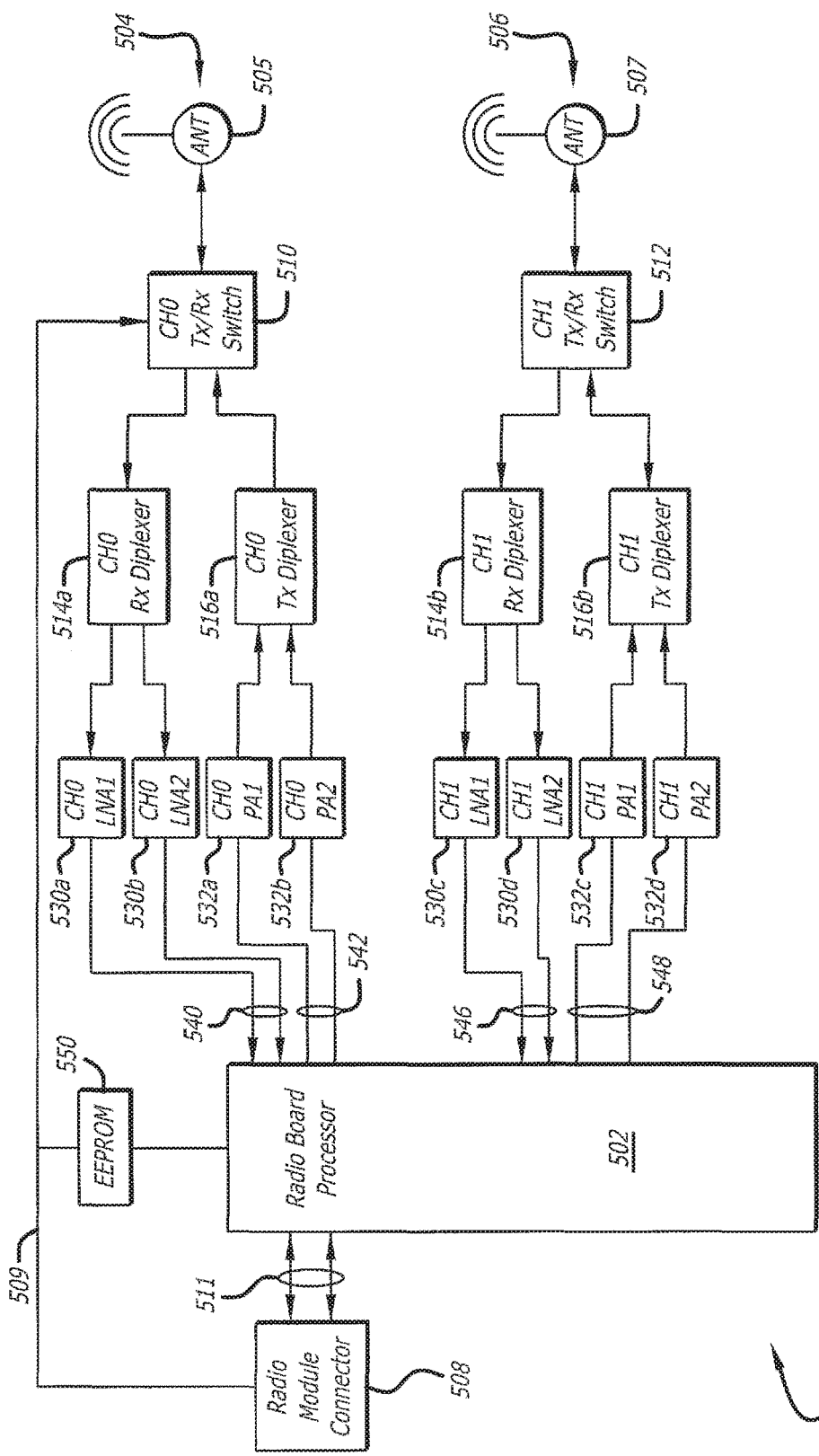
FIGS. 5 and 6 are schematic diagrams for examples of radios that may be implemented on a radio module shown in FIGS. 1 and 2.
Figure 6:
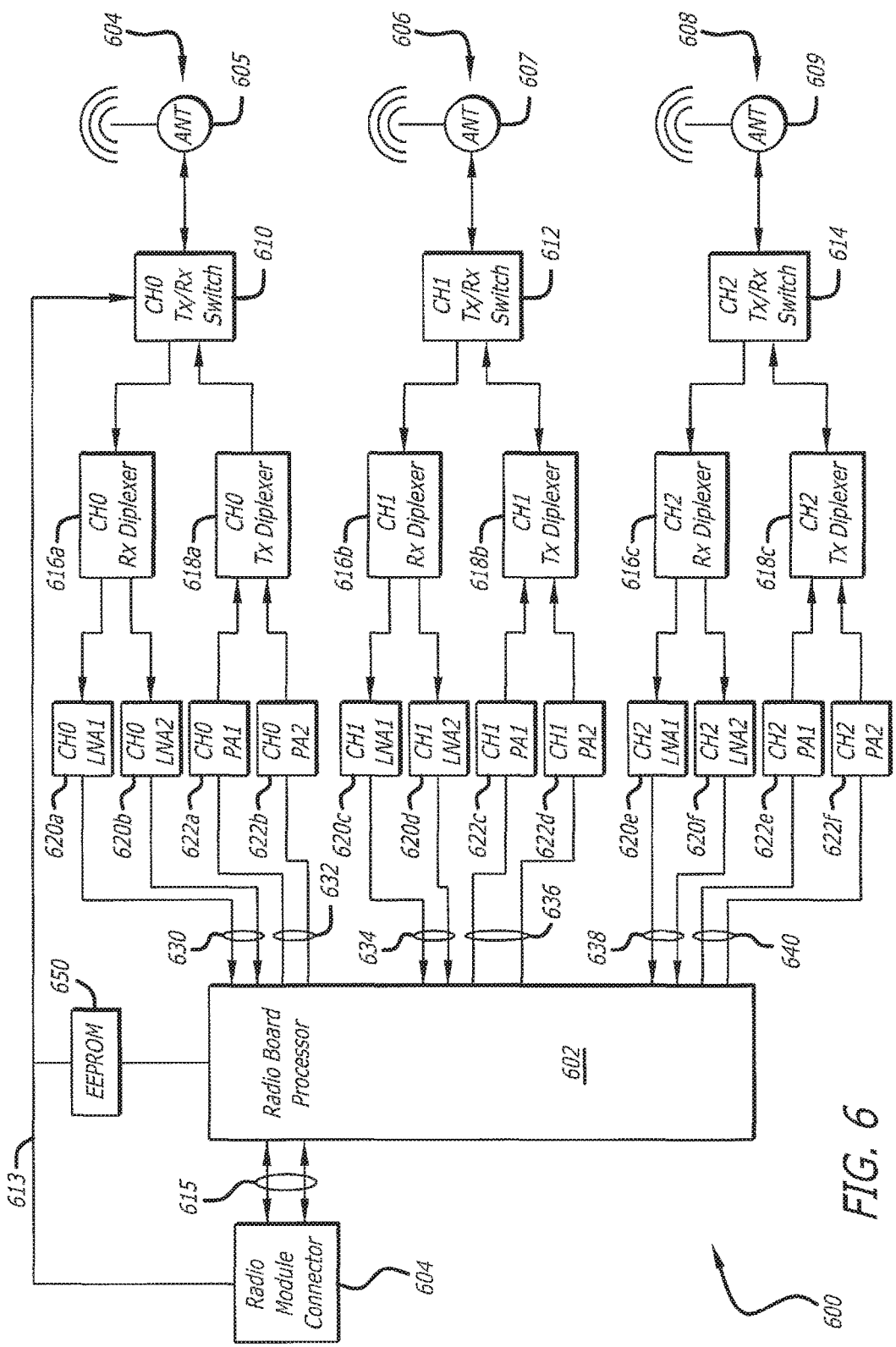

FIGS. 5 and 6 are schematic diagrams for examples of radios that may be implemented on a radio module shown in FIGS. 1 and 2. The radio 500 in FIG. 5 is a 2×2 MIMO radio and the radio 600 in FIG. 6 is a 3×3 MIMO radio. Other radios may also be used where implemented on boards that share the same size, outline, mechanical form, and electrical interface for operation with the controller 100, 200 (in FIG. 2). This allows multiple systems, with various performance characteristics, to be created from one central processor platform by combining different radio cards. Wireless characteristics that can be varied include MIMO configuration (number of transmit/receive chains), number of spatial streams (1, 2 or 3) and 802.11n features such as transmit beam forming or low density parity checking. Additionally, all radio boards may be made interoperable between a smaller 4/8-port platform (such as for example, the system in FIG. 1) and a larger 8/12/16 port platform (such as for example the system in FIG. 2).

FIG. 5 shows a 2×2 MIMO radio board 500 that uses a radio board processor 502 configured to perform digital media access control ("MAC") and baseband functions of the radio as well as the analog RF functions. In an example implementation, the radio board processor 502 may be based on an Atheros AR9392 chipset. The configuration in FIG. 5 shows a radio board 500 configured for 2×2 MIMO operation. The radio board 500 supports two spatial streams 504, 506 (also indicated as "Chain 0" and "Chain 1," respectively) and may sustain connection rates up to 300 Mbps in an application configured for operation according to the 802.11n specification.

The first spatial stream 504 and second spatial stream 506 include corresponding first and second antennas 505, 507. In an example implementation of the radio board 500, the first and second antennas 505, 507 may be configured to operate as described in the '040 and the '091 applications listed above. The first and second antennas 505, 507 each connect to tx/rx switches 510, 512, respectively in FIG. 5. The tx/rx switches 510, 512 may be controlled using a control connection to the radio board processor 502 to control whether the radio board is receiving or transmitting data wirelessly. The radio board 500 may be configured to implement advanced features of the 802.11n specification such as maximal ratio combining, beam forming and low density parity checking. The peripheral communication interface on the Atheros AR9392 is PCIe® so it plugs directly into a controller having a PCIe® interface, which may be one of the controllers 302, 402 described above with reference to both FIGS. 3 and 4.

Each tx/rx switch 510, 512 connects to diplexers that multiplex or demultiplex data over two lanes in each spatial stream 504, 506. In an example implementation, the diplexers switch the bandwidth of the radio operation between different radio bands. For example, the radio 500 in FIG. 5 may operate selectively in both the 2.4 Ghz and 5.0 Ghz unlicensed frequency bands. The diplexers enable the selection of the bands during radio operation. In the radio 500 in FIG. 5, the first tx/rx switch 510 connects to a chain 0 receiver diplexer 514a for receiving data, and a chain 0 transmitter diplexer 516a. The chain 0 receiver diplexer 514a receives data from the first antenna 505 via the tx/rx switch 510 (when triggered to receive data). The chain 0 receiver diplexer 514a de-multiplexes the data received from the first antenna 505 for output along parallel paths, each path having a first and second chain 0 low noise amplifier 530a, 530b. The first and second chain 0 low noise amplifiers 530a, 530b output received signals along respective chain 0 receiving lanes 540 to the radio board processor 502. The chain 0 receiving lanes 540 communicate analog RF signals that are processed by the radio board processor 502 consistent with the specifications under which the signal was communicated.

The chain 0 transmitter diplexer 516a multiplexes the data received from parallel transmitting paths at outputs of a first and second chain 0 power amplifier 532a, 532b and outputs the multiplexed signal to the first transmit/receive ("tx/rx") switch 510 for transmitting data wireless via the antenna 505 when switched to transmit. The first and second chain 0 power amplifiers 532*a*, 532*b* receive analog RF signals configured by the radio board processor 502 for wireless transmission pursuant to a selected specification understood by a client device to which the RF signals are directed. The analog RF signals are output by the radio board processor 502 on a pair of chain 0 transmitting lanes 542 connected to the first and second chain 0 power amplifiers 532*a*, 532*b*.

With respect to the second chain, chain 1, the second tx/rx switch 512 connects to a chain 1 receiver diplexer 514*b* for receiving data from the antenna 507, and a chain 1 transmitter diplexer 516*b* for transmitting data. The chain 1 receive diplexer 514*b* receives data from the second antenna 507 via the tx/rx switch 512 (when triggered to receive data). The chain 1 diplexer 514*b* demultiplexes the data received from the second antenna 507 for output along parallel paths having a first and second chain 1 low noise amplifier 530*c*, 530*d*. The first and second chain 1 low noise amplifiers 530*c*, 530*d* output received signals along respective chain 1 receiving lanes 546 to the radio board processor 502. The chain 1 receiving lanes 546 communicate analog RF signals that are processed by the radio board processor 502 consistent with the specifications under which the signal was communicated.

The chain 1 transmit diplexer 516*b* multiplexes the data received from parallel transmitting paths at outputs of a first and second chain 1 power amplifier 532*c*, 532*d* and outputs the multiplexed signal to the second tx/rx switch 512. The first and second chain 1 power amplifiers 532*c*, 532*d* receive analog RF signals configured by the radio board processor 502 for wireless transmission pursuant to a selected specification understood by a client device to which the RF signals are directed. The analog RF signals are output by the radio board processor 502 on a pair of chain 1 transmitting lanes 548 connected to the first and second chain 1 power amplifiers 532*c*, 532*d*.

FIG. 6 shows a 3×3 MIMO radio board 600 that uses a radio board processor chip 602 configured to perform digital media access control ("MAC") and baseband functions of the radio as well as the analog RF functions. In an example implementation, the radio board processor 602 may be based on an Atheros AR9390 chipset. The configuration in FIG. 6 shows a radio board 600 configured for 3×3 MIMO operation. The radio board 600 supports three spatial streams 604, 606, 608 (also indicated as "Chain 0," "Chain 1," and "Chain 2" respectively) and may sustain connection rates up to 450 Mbps in an application configured for operation according to the 802.11n specification.

The three spatial streams 604, 606, 608 include corresponding first, second and third antennas 605, 607, 609. In an example implementation of the radio board 600, the three antennas 605, 607, 609 may be configured to operate as described in the '040 and the '091 applications listed above. The three antennas 605, 607, 609 each connect to corresponding tx/rx switches 610, 612, 614, respectively in FIG. 6. The tx/rx switches 610, 612, 614 may be controlled using a control connection to the radio processor 602 to control whether the radio board is receiving or transmitting data wirelessly. The radio board 600 may be configured to implement advanced features of the 802.11n specification such as maximal ratio combining, beam forming and low density parity checking. The processor interface on the Atheros AR9390 is PCI express so it plugs directly into the controller having a PCE express interface as described above with reference to both FIGS. 3 and 4.

Each tx/rx switch 610, 612, 614 connects to diplexers that multiplex or demultiplex data over two lanes in each spatial stream 604, 606, 608. For example, the first tx/rx switch 610 connects to a chain 0 receiver diplexer 616*a* for receiving data, and a chain 0 transmitter diplexer 618*a* for transmitting data. The chain 0 receiver diplexer 616*a* receives data from the first antenna 605 via the tx/rx switch 610 (when triggered to receive data). The chain 0 receiver diplexer 616*a* demultiplexes the data received from the first antenna 605 for output along parallel paths or lanes, each lane having a first and second chain 0 low noise amplifier 620*a*, 620*b*. The first and second chain 0 low noise amplifiers 620*a*, 620*b* output the received signals along respective chain 0 receiving lanes 630 to the radio board processor 602. The chain 0 receiving lanes 630 communicate analog RF signals that are processed by the radio board processor 602 consistent with the specifications under which the signal was communicated.

The chain 0 transmitter diplexer 618*a* multiplexes the data received from parallel transmitting paths or lanes at outputs of a first and second chain 0 power amplifier 622*a*, 622*b* and outputs the multiplexed signal to the first tx/rx switch 610 for transmitting data wireless via the antenna 605 when switched to transmit. The first and second chain 0 power amplifiers 622*a*, 622*b* receive analog RF signals configured by the radio board processor 602 for wireless transmission pursuant to a selected specification understood by a client device to which the RF signals are directed. The analog RF signals are output by the radio board processor 602 on a pair of chain 0 transmitting lanes 632 connected to the first and second chain 0 power amplifiers 622*a*, 622*b*.

With respect to the second chain, chain 1, the second tx/rx switch 612 connects to a chain 1 receiver diplexer 616*b* for receiving data from the antenna 607, and a chain 1 transmitter diplexer 618*b* for transmitting data. The chain 1 receive diplexer 616*b* receives data from the second antenna 607 via the tx/rx switch 612 (when triggered to receive data). The chain 1 diplexer 616*b* demultiplexes the data received from the second antenna 607 for output along parallel paths or lanes having a first and second chain 1 low noise amplifier 620*c*, 620*d*. The first and second chain 1 low noise amplifiers 620*c*, 620*d* output received signals along respective chain 1 receiving lanes 634 to the radio board processor 602. The chain 1 receiving lanes 634 communicate analog RF signals that are processed by the radio board processor 602 consistent with the specifications under which the signal was communicated.

The chain 1 transmit diplexer 618*b* multiplexes the data received from parallel transmitting paths or lanes at outputs of first and second chain 1 power amplifiers 622*c*, 622*d* and outputs the multiplexed signal to the second tx/rx switch 612. The first and second chain 1 power amplifiers 622*c*, 622*d* receive analog RF signals configured by the radio board processor 602 for wireless transmission pursuant to a selected specification understood by a client device to which the RF signals are directed. The analog RF signals are output by the radio board processor 602 on a pair of chain 1 transmitting lanes 636 connected to the first and second chain 1 power amplifiers 622*c*, 622*d*.

With respect to the third chain, chain 2, the third tx/rx switch 614 connects to a chain 2 receiver diplexer 616*c* for receiving data from the antenna 609, and a chain 2 transmitter diplexer 618*c* for transmitting data. The chain 2 receiver diplexer 616*c* receives data from the third antenna 609 via the tx/rx switch 614 (when triggered to receive data). The chain 2 diplexer 616*c* demultiplexes the data received from the third antenna 609 for output along parallel paths or lanes having a first and second chain 2 low noise amplifier 620*e*, 620*f*. The first and second chain 2 low noise amplifiers 620*e*, 620*f* output received signals along respective chain 2 receiving lanes 638 to the radio board processor 602. The chain 2 receiving lanes 638 communicate analog RF signals that are processed by the radio board processor 602 consistent with the specifications under which the signal was communicated.

The chain 2 transmit diplexer 618c multiplexes the data received from parallel transmitting paths or lanes at outputs of first and second chain 2 power amplifiers 622e, 622f and outputs the multiplexed signal to the third tx/rx switch 614. The first and second chain 2 power amplifiers 622e, 622f receive analog RF signals configured by the radio board processor 602 for wireless transmission pursuant to a selected specification understood by a client device to which the RF signals are directed. The analog RF signals are output by the radio board processor 602 on a pair of chain 2 transmitting lanes 640 connected to the first and second chain 2 power amplifiers 622e, 622f.

The radio boards 500 and 600 shown in FIGS. 5 and 6 are examples of radio modules that may be implemented as the radio modules 104a-h and 204a-p in FIGS. 1 and 2 respectively. The radio boards 500 and 600 may operate in a system designed to accommodate a common form-factor as described above with reference to FIGS. 5 and 6, but in conjunction with radio cards adapted for diverse functions. For example, some number of radio cards in the system could have a single antenna chain while the remainder has dual, MIMO antenna configurations. System permutations may be created from the following variations of radio boards:

Antenna configuration (i.e. SISO, 2×2 MIMO, 2×3 MIMO, 3×3 MIMO, etc.)
    Antenna types
        Directional vs Omnidirectional
    Various chip suppliers
        Qualcomm, Intel, Broadcom, Marvel, etc.
    Differing transmit power capabilities
        Internal vs. External power amplifiers
    Different types of RF technologies
        WiFi
            802.11 a/b/g/n/ac/ad
        Cellular
            UMTS
            HSPA
            LTE
        Bluetooth®

It is noted that the above description is not intended to be limiting in view of references to specific standards and known configurations. Rather, the modularity and flexibility provided by the radio module platforms enhances the variety of systems that may be configured.

It is also noted that example implementations of the radio modules 500 and 600 described with reference to FIGS. 5 and 6 may be configured to provide bandwidths of up to 300 Gbps and 450 Gbps, respectively. In addition, the radio modules 300 and 400 may be configured for modularity to conform to a common form factor, and where there is a size limitation, the radio modules 300 and 400 may create challenging operating environments at such high frequencies. It is to be understood by those of ordinary skill in the art that the design of components such as examples of the radio modules 300 and 400 may require performing impedance matching and transmission line analysis for the conductive path and any components between the antennas and the radio processor. The need for such techniques and analysis increases when discrete components are included in the radio chains as described above with reference to FIGS. 3 and 4. Impedance matching and transmission line analysis are known to those of ordinary skill in the art. In addition, the details involving their use will depend on design specifications and other factors relative to specific implementations.

V. High-Speed Radio Module Interface with In-Line Processing

A. Intelligent High-Speed Radio Module Interface

Figure 7:
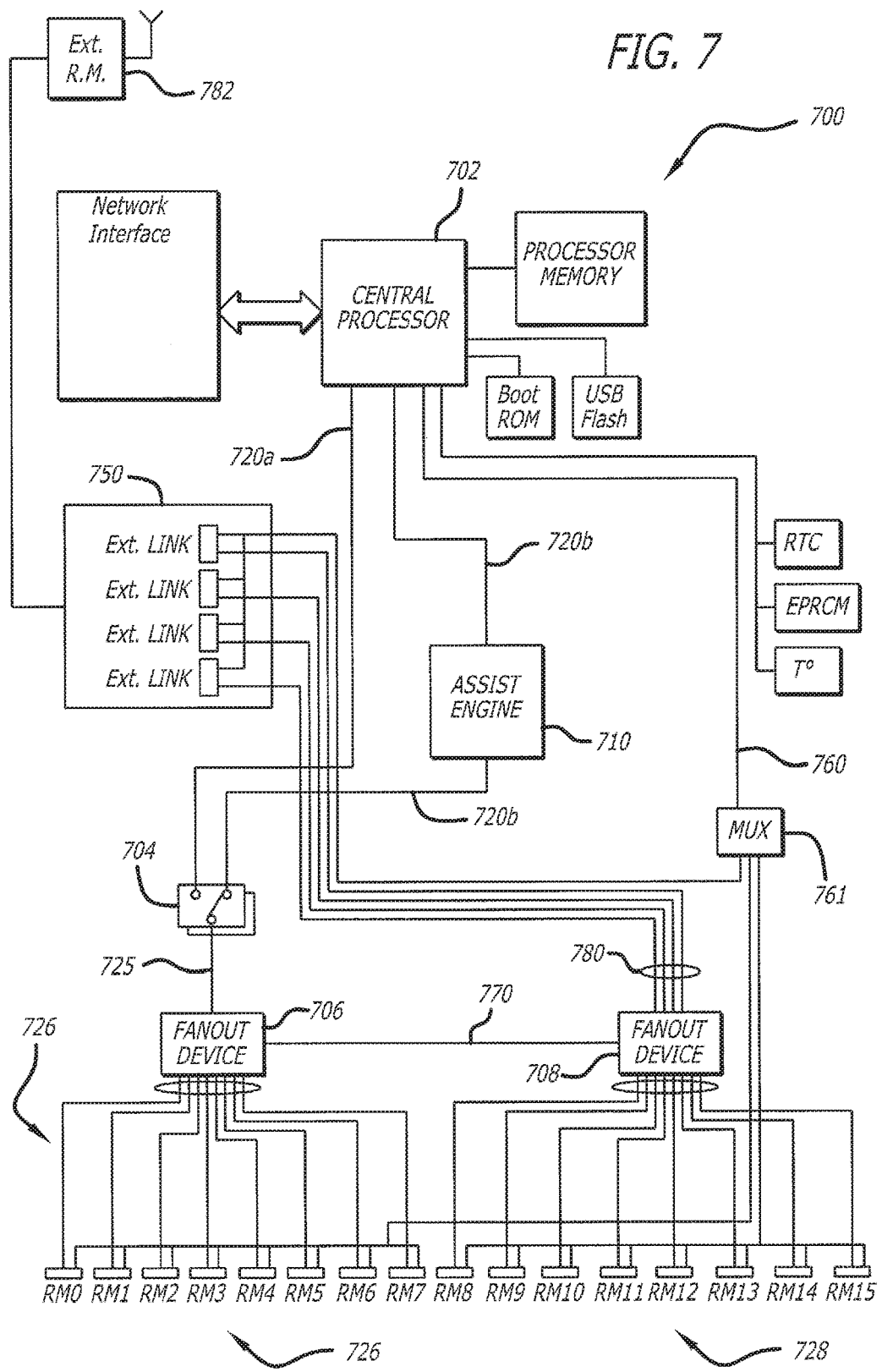
FIG. 7 is a schematic diagram of a controller that may be used in the wireless network access device shown in FIG. 2.

FIG. 7 is a schematic diagram of a controller 700 that may be used in an example implementation of a wireless network access device such as an example of the wireless network access device 200 shown in FIG. 2. The controller 700 in FIG. 7 includes a controller processor 702, signal switches 704a and 704b, radio path fanout devices 706 and 708, an assist engine 710, and an external device interface 750. The devices are interconnected in a manner similar to the controller 200 described with reference to FIG. 2. The controller processor 702 communicates with up to 16 radio modules 726, 728 via a selectable radio interface path 720a, 720b, which includes a first four-lane path 720a and a second four-lane path 720b connected to the signal switches 704a,b. The signal switches 704a,b are set to select one of the two radio interface paths 720a,b to use as a single link to a selected one of the up to sixteen radio modules 726, 728. The first group of the up to sixteen radio modules 726 is connected to the first radio path fanout device 706 via up to eight single lane links connected to a corresponding radio module. The second group of the up to sixteen radio modules 728 is connected to the second radio path fanout device 708 via up to eight single lane links connected to a corresponding radio module. The signal switches 704a and 704b and radio path fanout devices 706, 708 may be controlled by the controller processor 702 over an integrated interface control bus 760 or via control signals forming part of the processor's control bus.

The second radio path fanout device 708 may include a fanout device coupling 770 to the first radio path fanout device 706. The fanout device coupling 770 may be a four lane link configured to permit any of the up to eight radio modules 728 connected to the second radio path fanout device 708 to connect via the first radio path fanout device 706 to the controller processor 702. The connections from the first radio path fanout device 706 to the first group of radio modules 726 may include 8 1×1 links forming 8 single lane links that are connected to one of the two four-lane links, which are the radio interface paths 720a, 720b. The second radio path fanout device 708 may also include four single lane links at 780 connected to corresponding external output ports in the external device interface 750.

The example illustrated in FIG. 7 may provide a variety of performance, diagnostic, test or function enhancing assist functions using the assist engine 710 and operating the second radio interface path 720b for communication to the radio modules 726,728, or to the external devices connected to the external device interface 750. FIG. 7 shows one assist engine 710, however, multiple assist engines 710 may be configured and inserted into the radio interface path 720b.

In an example implementation, the assist engine 710 may be a field-programmable gate array ("FPGA") programmed with any suitable or desirable assisting function. In general, the radio interface paths 720a, 720b may be configurable by control software operating under control of the controller processor 702 to select between the two paths 720a, 720b. The controller processor 702 may select between the first radio interface path 720a having a direct connection to the controller processor 702 and the second radio interface path 720b with the assist engine 710 inserted into the path 720b. The assist engine 710 may be used to process data and/or control traffic in-line with the radio processing path 720b ("in-line processing" functions), as look-aside hardware assist engines ("look-aside processing" functions) for the controller processor 702, or as an auxiliary processor that controls communication between the controller processor 702 and one or more external devices connected to the external device interface 750.

The assist engine 710 may perform a variety of functions depending on the use case of the wireless network access device (such as 200 in FIG. 2). For example, functions that may be implemented with in-line processing performed by the assist engine 710 include, but are not limited to, the following examples:

Counting data packets
Inspecting packets for specific content and then acting on what it finds (like setting an interrupt for example).
Queuing data traffic
Policing data traffic
Memory address checking Functions that may be implemented with look-aside processing include the following:

Encryption/Decryption
Frame aggregation/de-aggregation
Packet parsing
Frame translation The assist engine 710 may include functions that use the connections 780 to the external device interface 750 for any suitable purpose. For example, the four device connections in the external device interface 750 may be used to connect to one or more external radio modules 782. The external radio modules 782 may be configured in a variety of ways. For example, the external radio module 782 may be any radio module having at least an electrical interface configured to communicate with the controller 700. The external radio module 782 may or may not have the same form factor that would allow it to operate as one of the radio modules 726, 728 configured to operate with the controller 700. The external radio module 782 may be used to provide a specialized link to specially selected clients, or clients located in a specific area. The external radio module 782 may also implement a different type of wireless communication link than the radio modules 726, 728 configured to operate with the controller 700. In another example, the external radio module 782 may not be a 'radio' module, but rather a wireless connection using a different type of wireless signal, such as infrared, laser, any optical, any electromagnetic other than radio, or any other type of wireless signal. The external radio module 782 may be implemented to expand functions, capacity, or performance, or to provide diagnostic testing.

B. High-Speed Radio Module Interface Bridge

Figure 8:
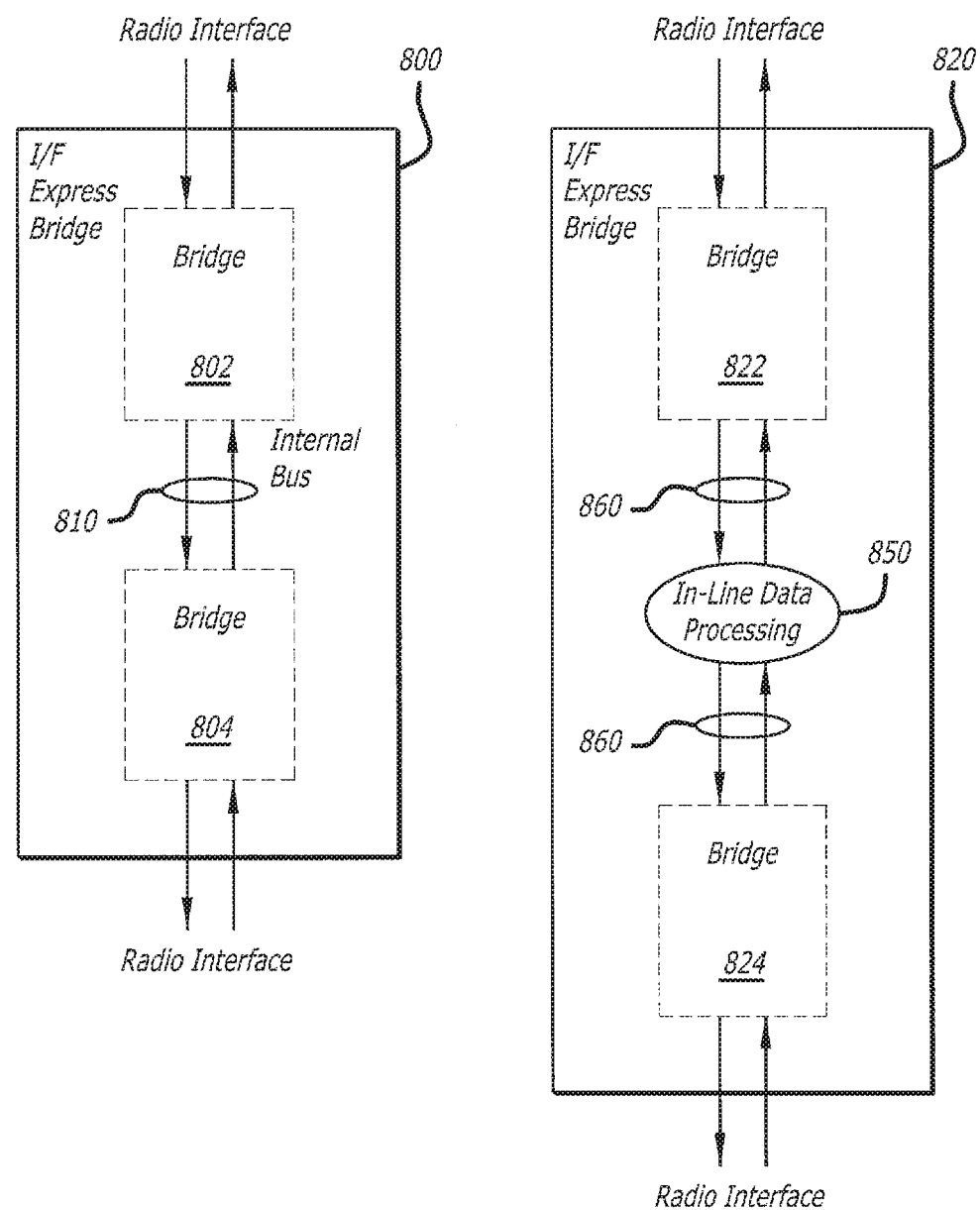
FIG. 8 illustrates operation of an example of a high-speed radio module interface bridge and an interface bridge having in-line data processing.

The assist engine 710 shown in FIG. 7 may be used to provide other types of processing assist functions other than those described above with reference to FIG. 7. For example, an assist engine 710 may be implemented as an in-line data processing function in an interface bridge. FIG. 8 illustrates operation of an example of a high-speed radio module interface bridge 800 and an interface bridge having in-line data processing 820. FIG. 8 shows a block diagram of the interface bridge 800 in normal operation utilizing a first internal interface bride 802 and a second internal interface bridge 804 connected back-to-back by an internal bus 810. The interface bridge 800 is configured to pass traffic consistent with the interface standard (PCI Express, for example) between two external interfaces.

The interface bridge having in-line data processing 820 also includes a first internal interface bridge 822 and a second internal interface bridge 824, but with an in-line data processing function 850 operating between the first and second interface bridges 822, 824 over an internal bus 860. The in-line data processing function 850 may be configured to perform any desired function. The in-line data processing function 850 intercepts the communications traffic from the external interfaces and may perform functions on the intercepted data. Examples of the types of functions that may be performed on the data include:

Counting data packets
Inspecting packets for specific content and then acting on what it finds (like setting an interrupt for example).
Queuing data traffic
Policing data traffic The interface bridge 820 with internal processing may be implemented in either custom silicon such as a standard cell chip or programmable silicon such as an FPGA.

It will be understood that the foregoing description of numerous implementations has been presented for purposes of illustration and description. It is not exhaustive and does not limit the claimed inventions to the precise forms disclosed. For example, the above examples have been described as implemented according to IEEE 802.11an and 802.11bgn. Other implementations may use other standards. The number of radios in the sectors and the number of sectors defined for any given implementation may also be different. Modifications and variations are possible in light of the above description or may be acquired from practicing the invention. The claims and their equivalents define the scope of the invention.

What is claimed is:

1. A wireless network access device comprising:
 a processor;
 a radio interface comprising a plurality of individually addressable radio paths terminating in a corresponding plurality of connectors, each radio path for providing a connection from the processor to a corresponding radio module;
 one or more radio modules engaged with corresponding connectors from the plurality of connectors;
 a network interface configured to provide access to a data network; wherein
  the processor is configured to manage communications between the client devices that communicate with the one or more radio modules and the data network via the radio interface and the network interface,
  each of the one or more radio modules is selected from a group of at least two different radio module types operable in the wireless network access device,
  each radio module type of the group of at least two different radio module types is configured to engage with any of the plurality of connectors and to operate independently of other radio modules present in the wireless access device, and
  each radio module type of the at least two radio module types differs from the other radio module types in at least one of a plurality of wireless radio communication characteristics.

2. The wireless network access device of claim 1 wherein the one or more radio module includes a first radio module having a first radio module type and a second radio module having a second radio module type.

3. The wireless network access device of claim 2 wherein the plurality of wireless communication characteristics includes any combination of the following types of characteristics: different antenna configurations, different antenna types, different component suppliers, different transmit power capabilities, and different radio frequency ("RF") technologies.

4. The wireless network access device of claim 2 wherein the first and second radio module types include antennas having different antenna configurations selected from the group consisting of:
Single In, Single Out ("SISO");
Multiple In, Multiple Out ("MIMO"); and
n.times.m MIMO, where n and m indicate a number of receiving and transmitting spatial streams.

5. The wireless network access device of claim 2 wherein the first and second radio module types include different antenna types selected from the group consisting of directionalized antennas and omni-directional antennas.

6. The wireless network access device of claim 2 wherein the first and second radio module types employ different RF technologies selected from the group consisting of:
WiFi operating under any suitable standard including IEEE 802.11a, IEEE 802.11b, IEEE 802.11g, IEEE 802.11n, IEEE 802.11ac, and IEEE 802.11ad;
mobile telecommunications operating under any suitable standard;
wireless personal area network communications operating under any suitable standard including Bluetooth®.

7. The wireless network access device of claim 1 where the plurality of individually addressable radio paths form multiple point-to-point connections between the processor and the radio modules.

8. The wireless network access device of claim 7 where the multiple point-to-point connections include at least one radio interface path between the processor and a fanout device comprising radio paths to each radio module where the processor forms individual connections over the radio paths via control of the fanout device.

9. The wireless network access device of claim 8 where the at least one radio interface path between the processor and the fanout device, and the radio paths to each radio module each includes at least one lane formed with at least one receiving line and at least one transmitting line.

10. The wireless network access device of claim 9 where the at least one receiving line and the at least one transmitting line each include a differential pair connection.

11. The wireless network access device of claim 7 where the multiple point-to-point connections include:
a plurality of radio interface paths between the processor and a switch; and
a single radio interface path between the switch and at least one fanout device each fanout device comprising radio paths to a corresponding set of the radio modules where the processor forms individual connections over the radio paths via control of the switch to select one of the plurality of radio interface paths between the processor and the switch, and control of the fanout devices to select the radio path to a desired radio module.

12. The wireless network access device of claim 11 where the plurality of radio interface paths between the processor and the switch, the single radio interface path between the switch and the at least one fanout device, and the plurality of radio paths between the at least one fanout device and each corresponding radio module each includes at least one lane formed with at least one receiving line and at least one transmitting line.

13. The wireless network access device of claim 12 where the at least one receiving line and the at least one transmitting line each include a differential pair connection.

14. The wireless network access device of claim 1 where the connectors are arranged in a substantially circular pattern.

15. The wireless network access device of claim 1 wherein the plurality of connectors are provided to permit insertion of from one to a maximum number of radio modules, the wireless network access device being configurable by populating the wireless network access device with a selected number and type of radio modules.

16. The wireless network access device of claim 15 where the wireless network access device is configurable to provide scalable wireless performance by inserting combinations of radio modules according to predetermined performance characteristics.

17. The wireless network access device of claim 16 where the predetermined performance characteristics are based on one or more of the following:
number of MIMO antennas;
number of MIMO spatial streams; and
maximum connection rate.

18. The wireless network access device of claim 1 where the radio interface operates in accordance with the Peripheral Component Interconnect Express ("PCIe") bus standard.

19. A method for wireless communications using a wireless network access device comprising a wireless network access device controller, a network interface, and a radio interface comprising a plurality of individually addressable radio paths terminating in a corresponding plurality of connectors for providing connections to corresponding radio modules, the method comprising:
configuring the wireless network access device by selecting one or more radio modules from a group of at least two different radio module types and engaging the selected radio modules with selected connectors from the plurality of connectors; and
the wireless network access device controller managing communications between client devices communicating over wireless connections with the selected radio modules and a data network via the radio interface and the network interface, wherein
each radio module type of the group of at least two different radio module types is configured to engage with any of the plurality of connectors and to operate independently of other radio modules present in the wireless network access device, and
each radio module type of the at least two different radio module types differs from the other radio module types in at least one of a plurality of wireless radio communication characteristics.

20. The method of claim 19 where the step of selecting the at least one radio module includes selecting first and second radio modules, the first and second radio modules differing in at least one of the following characteristics:
different antenna configurations,
different antenna types,
different component suppliers,
different transmit power capabilities, and
different radio frequency ("RF") technologies.

21. The method of claim 19 where the step of selecting the at least one radio module includes the step of selecting radio modules according to antennas on the radio modules having an antenna configuration selected from a group consisting of:
Single In, Single Out ("SISO");
Multiple In, Multiple Out ("MIMO"); and n.times.m MIMO, where n and m indicate a number of receiving and transmitting spatial streams.

22. The method of claim 19 where the step of selecting the at least one radio module includes the step of selecting radio modules that include either directionalized or omni-directional antennas or both.

23. The method of claim 19 where the step of selecting the at least one radio module includes the step of selecting radio modules from radio modules that operate according to a RF technology selected from a group consisting of:
- WiFi operating under any suitable standard including IEEE 802.11a, IEEE 802.11b, IEEE 802.11g, IEEE 802.11n, IEEE 802.11ac, and IEEE 802.11ad;
- mobile telecommunications operating under any suitable standard;
- wireless personal area network communications operating under any suitable standard including Bluetooth®.

24. The method of claim 19 where the step of selecting the at least one radio module includes selecting the radio modules according to predetermined performance characteristics.

25. The method of claim 24 where the step of selecting the radio modules according to predetermined performance characteristics includes selecting the predetermined performance characteristics based on one or more of the following:
- number of MIMO antennas;
- number of MIMO spatial streams; and
- maximum connection rate.

26. The method of claim 19 where the step of managing communications includes the step of:
- establishing a communication path along an individually addressable radio path corresponding to a selected radio module.

27. The method of claim 26 where the step of establishing the communication path includes the steps of:
- controlling a switch to select one of at least one radio interface path between a central processor and the switch; and
- controlling a fanout device to select one of at least one radio path to the selected radio module.

* * * * *